(12) United States Patent
Kim et al.

(10) Patent No.: US 7,839,813 B2
(45) Date of Patent: Nov. 23, 2010

(54) METHOD AND APPARATUS FOR REORDERING RECEIVED PACKETS IN MOBILE TELECOMMUNICATION SYSTEM

(75) Inventors: Soeng-Hun Kim, Suwon-si (KR);
Kyeong-In Jeong, Hwaseong-si (KR);
Gert Jan Van Lieshout, Middlesex (GB); Himke Van Der Velde, Middlesex (GB)

(73) Assignee: Samsung Electronics Co., Ltd (KR)

( * ) Notice: Subject to any disclaimer, the term of this patent is extended or adjusted under 35 U.S.C. 154(b) by 708 days.

(21) Appl. No.: 11/764,612

(22) Filed: Jun. 18, 2007

(65) Prior Publication Data

US 2008/0107053 A1     May 8, 2008

(30) Foreign Application Priority Data

Jun. 16, 2006     (KR) .................. 10-2006-0054330

(51) Int. Cl.
*H04B 7/212* (2006.01)
(52) U.S. Cl. .............. 370/322; 370/328; 370/335; 370/394
(58) Field of Classification Search .......... 370/322, 370/328, 320, 333, 335, 342, 394, 395.4, 370/395.62, 329, 444; 455/455, 451, 450; 714/776, 755, 748, 749
See application file for complete search history.

(56) References Cited

U.S. PATENT DOCUMENTS

| | | | |
|---|---|---|---|
| 6,901,063 B2 | 5/2005 | Vayanos et al. | |
| 2003/0169741 A1 | 9/2003 | Torsner et al. | |
| 2003/0210669 A1* | 11/2003 | Vayanos et al. | 370/335 |
| 2003/0227875 A1 | 12/2003 | Wei et al. | |
| 2005/0237932 A1* | 10/2005 | Liu | 370/230 |
| 2005/0281232 A1 | 12/2005 | Kim et al. | |
| 2006/0062223 A1 | 3/2006 | Manuel et al. | |
| 2006/0092973 A1* | 5/2006 | Petrovic et al. | 370/469 |
| 2006/0209783 A1* | 9/2006 | Jain et al. | 370/349 |
| 2007/0106924 A1* | 5/2007 | Seidel et al. | 714/748 |
| 2008/0209297 A1* | 8/2008 | Chandra et al. | 714/748 |
| 2009/0034487 A1* | 2/2009 | Lohr et al. | 370/335 |

FOREIGN PATENT DOCUMENTS

| | | |
|---|---|---|
| EP | 1 583 274 | 10/2005 |
| WO | WO 03/019853 | 3/2003 |
| WO | WO 2004/073273 | 8/2004 |
| WO | WO 2005/112357 | 11/2005 |

* cited by examiner

*Primary Examiner*—Jean A Gelin
(74) *Attorney, Agent, or Firm*—The Farrell Law Firm, LLP (57) ABSTRACT

Disclosed is a method and an apparatus for reordering received packets in a mobile telecommunication system supporting HARQ so that the problem of order change is solved. The method includes receiving from a receiving-side HARQ entity an input of a packet and processing time spent by the packet going through an HARQ operation; determining if a gap corresponding to at least one missing packet among received packets is detected based on the input packet belonging to the received packets and, when the gap is detected, waiting for the missing packet belonging to the gap to be received for a period of time obtained by subtracting the processing time from a predetermined maximum waiting value; and outputting the received packets to an upper layer in an order when the missing packet belonging to the gap fails to be received before the expiration of the period of time.

10 Claims, 6 Drawing Sheets

METHOD AND APPARATUS FOR REORDERING RECEIVED PACKETS IN MOBILE TELECOMMUNICATION SYSTEM

PRIORITY

This application claims priority to an application entitled "Method and Apparatus for Reordering Received Packets in Mobile Telecommunication System" filed with the Korean Intellectual Property Office on Jun. 16, 2006 and assigned Ser. No. 2006-54330, the contents of which are incorporated herein by reference.

BACKGROUND OF THE INVENTION

1. Field of the Invention

The present invention relates to a mobile telecommunication system, and more particularly to a method and an apparatus for conducting communication by using a Hybrid Automatic Retransmission reQuest (HARQ).

2. Description of the Related Art

As generally known in the art, the UMTS (Universal Mobile Telecommunication Service) system refers to the $3^{rd}$ generation asynchronous mobile telecommunication system, which is based on the European mobile telecommunication systems, particularly the GSM (Global System for Mobile Communications) and the GPRS (General Packet Radio Services), and which employs Wideband Code Division Multiple Access (W-CDMA).

The 3GPP ($3^{rd}$ Generation Partnership Project), which is in charge of the UMTS standardization, is currently discussing Long Term Evolution (LTE) as the next generation mobile telecommunication system of the UMTS system. The LTE, which is expected to be commercialized in about 2010, refers to technology for implementing high-speed packet-based communication having a transmission rate of a maximum of 100 Mbps. Various schemes are being studied to this end. For example, it has been proposed to simplify the network structure so that the number of nodes existing on the communication channels is reduced. A scheme for bringing radio protocols the closest to radio channels is also under discussion.

Figure 1:
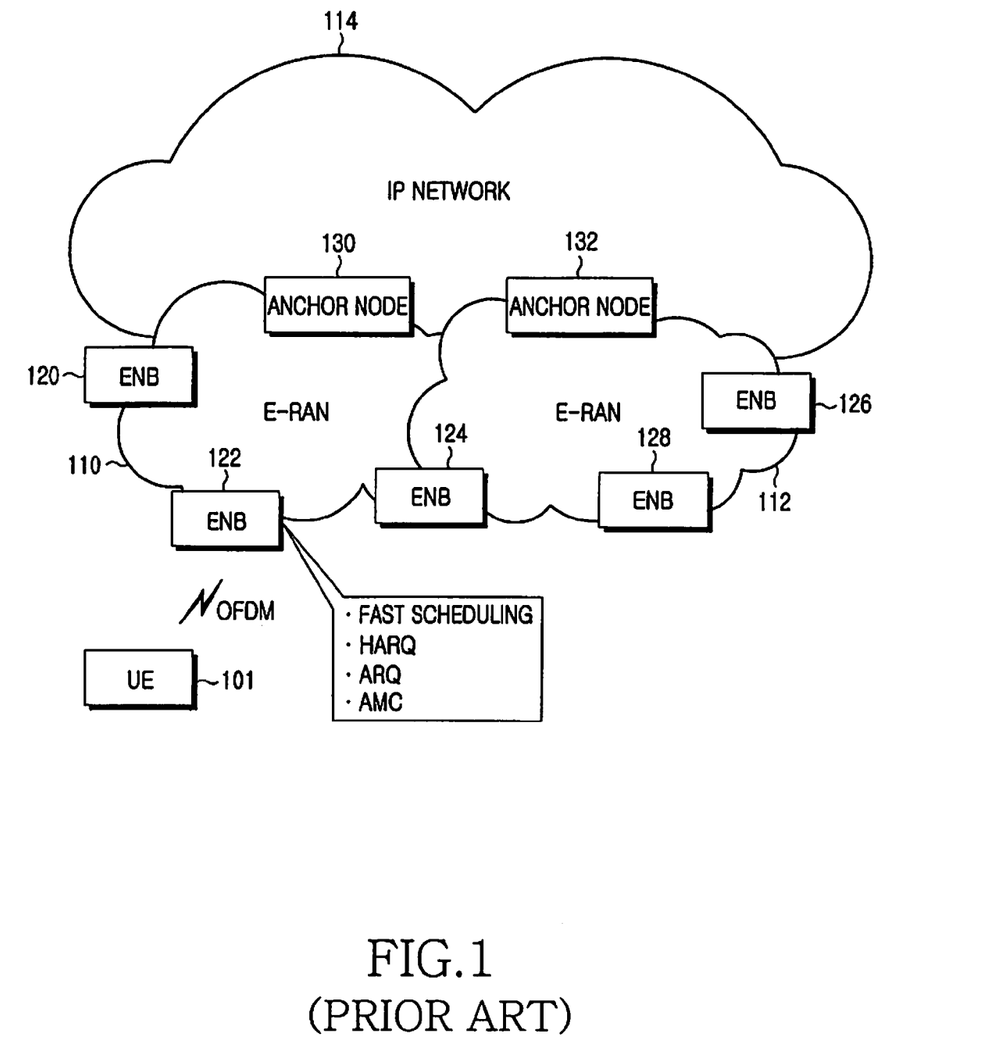
FIG. 1 shows the structure of an exemplary evolved mobile telecommunication system.

FIG. 1 shows the structure of an exemplary evolved mobile telecommunication system.

Referring to FIG. 1, Evolved Radio Access Networks (E-RANs) 110 and 112 are simplified into a two-node structure including Evolved Node Bs (ENBs or node Bs) 120, 120, 124, 126, and 128 and anchor nodes 130 and 132. The anchor nodes 130 and 132 may be defined as Evolved Gateway GPRS Serving Nodes (EGGSNs). A User Equipment (UE) 101 can access an Internet Protocol (IP) network 114 via the E-RAN 110.

The ENBs 120-128 correspond to conventional node Bs of the UMTS system, and are connected to the UE 101 via radio channels. Unlike conventional node Bs, the ENBs 120-128 play more complex roles. In the case of the LTE, for example, an apparatus for collecting information regarding the condition of UEs and scheduling them are necessary so that all user traffic, including a real-time service such as Voice over IP (VoIP), is available via a shared channel. To this end, the LTE relies on ENBs 120-128 to schedule the UEs.

In order to implement a maximum transmission rate of 100 Mbps, the LTE is expected to employ Orthogonal Frequency Division Multiplexing (OFDM) as the radio access technology in the 20 MHz bandwidth. In addition, the modulation scheme and the channel coding rate are determined according to the channel condition of UEs, i.e. an Adaptive Modulation & Coding (AMC) scheme will be adopted.

The shared channel plays a role similar to that of a High Speed Packet Data Shared Channel (HS-PDSCH) for High Speed Downlink Packet Access (HSDPA), via which user traffic is transmitted, or that of an Enhanced Uplink Dedicated Packet Channel (E-DPDCH) for an Enhanced Uplink Dedicated Channel (E-DCH).

The LTE also conducts HARQ between the ENBs 120-128 and the UE 101 as in the case of HSDPA or E-DCH. However, the HARQ alone cannot satisfy various requirements on Quality of Service (QoS). Therefore, outer HARQ may be conducted in the upper layer between the UE 101 and the ENBs 120-128.

As used herein, HARQ refers to a technique for increasing the data success ratio of the receiving side by soft-combining previously received data (i.e. packets) with retransmitted packets without discarding the data. Services supporting HSDPA and E-DCH adopt the HARQ scheme so as to increase the transmission efficiency during high-speed packet transmission. The LTE also employs the HARQ scheme between the UE 101 and the ENBs 120-128.

However, adoption of the HARQ scheme inevitably changes the order of packets.

Figure 2:
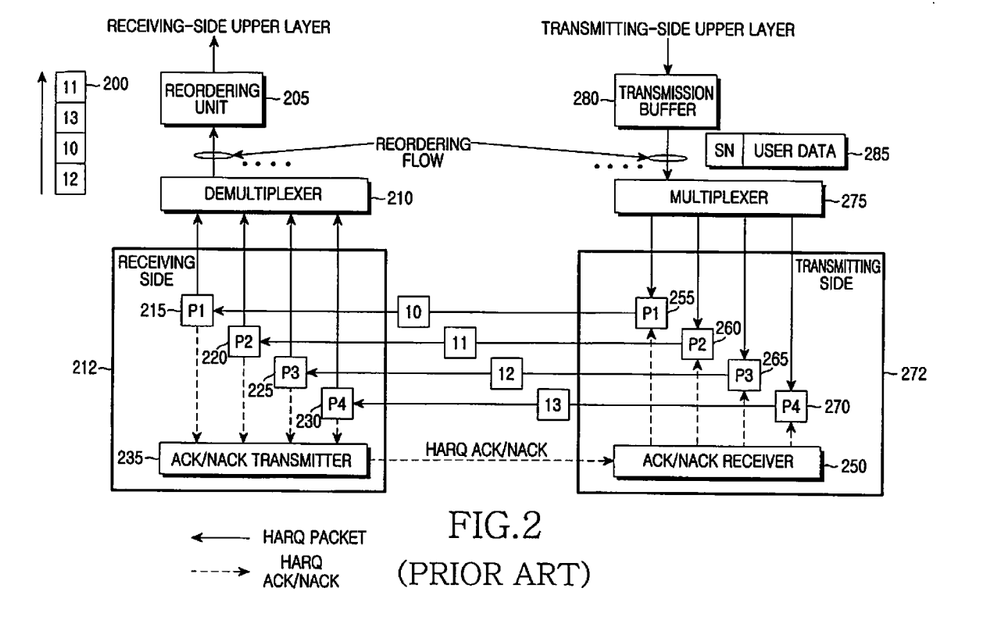
FIG. 2 shows a typical HARQ operation scheme.

FIG. 2 illustrates a typical HARQ operation and the resulting change of order.

Referring to FIG. 2, the HARQ layer is classified into a transmitting-side HARQ entity 272 and a receiving-side HARQ entity 212 according to the operation. The transmitting-side HARQ entity 272 is adapted to transmit and retransmit HARQ packets, and the receiving-side HARQ entity 212 is adapted for soft-combining of HARQ packets and ACKnowledged/Non-ACKnowledged (ACK/NACK) transmission according to whether or not respective HARQ packets have errors. UEs and node Bs can have both transmitting-side and receiving-side HARQ entities 272 and 212 in response to the downlink or uplink service. Therefore, the following descriptions of the transmitting and receiving sides are not confined to one of UEs or node Bs.

The transmitting and receiving sides have a number of upper layer entities (not shown), a multiplexer 275, and a demultiplexer 210 in order to provide various services through HARQ entities.

The multiplexer 275 is adapted to receive various pieces of data 285 created by various upper layer entities via a transmission buffer 280, insert multiplexing information into the data 285, and transmit the multiplexed data to the receiving-side HARQ entity 272. The demultiplexer 210 is adapted to forward data from the receiving-side HARQ entity 212 to a suitable upper layer entity by using the multiplexing information of the data.

The transmitting/receiving HARQ entities 212 and 272 are the main devices for conducting the HARQ operation, and include a number of HARQ processors 255, 260, 265, 270, 215, 220, 225 and 230. The HARQ processors 255-270 and 215-230 are basic unit devices for transmitting/receiving HARQ packets. The transmitting-side HARQ processors 255-270 are adapted to transmit and retransmit HARQ packets, and the receiving-side HARQ processors 215-230 are adapted to receive and soft-combine HARQ packets and transmit ACK/NACK according to whether or not errors are detected from the HARQ packets.

Sets of transmitting-side and receiving-side HARQ processors 255-270, and 215-230 exist in the transmitting and receiving sides 272 and 212, respectively. Each HARQ entity 272 and 212 has a number of HARQ processors 255-270 and 215-230 so that the HARQ operation is possible without interruption. The HARQ operation includes operations for transmitting HARQ packets by HARQ processors, receiving ACK/NACK in response, and retransmitting the HARQ packets. When a single HARQ processor exists in an HARQ entity, it is not until an HARQ packet is transmitted and corresponding ACK/NACK is received that the next HARQ packet is transmitted. When there are a number of HARQ processors, in contrast, a processor waits to receive ACK/NACK, and another process transmits the next HARQ packet during that time. Therefore, HARQ entities have a number of HARQ processors so that HARQ packets can be transmitted/received without interruption.

The basic operation of HARQ processors will now be described with reference to FIG. 2.

Transmitting side: a transmitting-side HARQ processor, i.e. one of HARQ P1 255, HARQ P2 260, HARQ P3 265, and HARQ P4 270, channel-codes data received from the multiplexing block 275, composes an HARQ packet from the channel-coded data, and transmits the HARQ packet to the receiving side 212. The channel-coded data is stored in a retransmission buffer (not shown) for later retransmission. Upon receiving ACK regarding the HARQ packet from an ACK/NACK transmitter 235, an ACK/NACK receiver 250 flushes the channel-coded data from the retransmission buffer. When NACK regarding the HARQ packet is received from the ACK/NACK transmitter 235, an HARQ packet is composed from the channel-coded data and is retransmitted.

Receiving side: a receiving-side HARQ processor, i.e. one of HARQ P1 215, HARQ P2 220, HARQ P3 225, and HARQ P4 230, which corresponds to the transmitting-side HARQ processor, channel-decodes an HARQ packet received via a physical channel and confirms whether or not the HARQ packet has an error based on a Cyclic Redundancy Check (CRC). If an error exists, data of the HARQ packet is temporarily stored in an HARQ buffer (not shown), and NACK is transmitted to the transmitting side 272 via the ACK/NACK transmitter 235. When retransmission data regarding the HARQ packet is received later, the data stored in the HARQ buffer is soft-combined with the retransmitted data, and another error check is conducted. If it is confirmed that the error still exists, the ACK/NACK transmitter 235 retransmits NACK regarding the HARQ packet again, and repeats the above operation. If it is confirmed that the error has been removed, ACK is transmitted to the ACK/NACK receiver 250, and data in the HARQ buffer is transmitted to the demultiplexer 210.

As mentioned above, the two sets of HARQ processors assigned to the transmitting and receiving sides 272 and 212, respectively, can improve the ratio of successful receipt based on the HARQ operation including retransmission of erroneous HARQ packets and soft combining.

The HARQ operation changes the order of packets. For example, packets are given respective Sequence Numbers (SNs) according to the order of their original creation. Assuming that four HARQ processors are processing packets having an SN of 10, 11, 12, and 13, respectively, i.e. packet 10, packet 11, packet 12, and packet 13, the order in which they are transmitted from the receiving side to the upper layer may differ from that in which they were originally created, depending on how many retransmissions are conducted by respective HARQ processors.

It is assumed that a transmitting-side processor P2 260 has successfully received packet 11 after a single time of transmission, P4 270 has successfully received packet 13 after two times of transmission, P1 255 has successfully received P10 after three times of transmission, and P3 260 has successfully received packet 12 after four times of transmission. Then, the order of packets transmitted from the demultiplexing block 210 to the upper layer is: packet 11, packet 13, packet 10, and packet 12, as indicated by reference numeral 200. When an HARQ processor has successfully received a packet, its error has been removed through a soft combining operation, for example. Particularly, a successfully received packet refers to one confirmed to have no error as a result of the CRC operation.

In order to avoid such a change of order, the transmitting side assigns SNs to transmitted packets according to the transmission order, and the receiving side uses a reordering buffer 205 so that, based on the SNs, the received packets are reordered and transmitted to the upper layer.

However, it is to be noted that an HARQ packet may have a number of multiplexed upper layer packets. This means that, if the upper layer packets are reordered for respective HARQ packets, transmission of an important upper layer packet may be delayed by a packet of little importance. Therefore, the reordering operation is conducted for each flow having similar importance or required QoS of each upper layer packet. For convenience of description, a flow acting as a unit of reordering will be referred to as "reordering flow." Such a reordering flow may be a flow created by an upper layer entity corresponding to a service, or a flow including a number of service flows having similar importance or required QoS.

Figure 3:
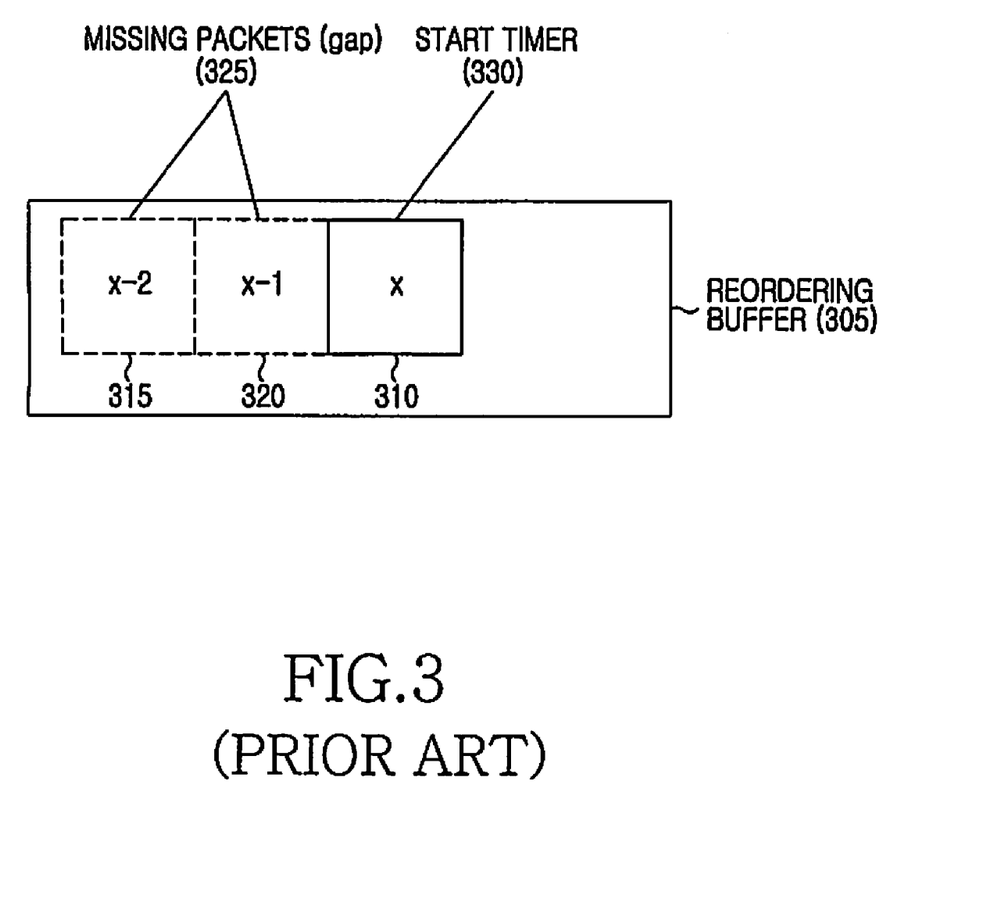
FIG. 3 shows a reordering scheme based on a timer according to the prior art.

FIG. 3 shows a reordering operation for each HARQ packet based on a timer according to the prior art.

Referring to FIG. 3, packets having SNs preceding x−3 have been reordered and transmitted to the upper layer from a reordering buffer 305, and packet x 310 has been transmitted. This means that packet x−2 315 and packet x−1 320 have failed to be received and that they are possibly processed by HARQ processors. At least one packet confirmed to be missing is referred to as a gap 325.

When a gap 325 is detected between received packets, the reordering buffer 305 starts the timer 330. If missing packets corresponding to the gaps 325, i.e. packet x−2 315 and packet x−1 320 fail to be received until the timer 330 stops, it is considered that the missing packets have failed to be received during the HARQ process. Then, packet x 310 is transmitted to the upper layer. In this case, packets 315 and 320 are abandoned from the HARQ layer.

However, the conventional reordering operation based on a timer is very inefficient, because it must take into consideration the worst change of order that may occur during the HARQ process. More particularly, the conventional approach does not consider respective conditions of missing packets, but only the worst condition, and then conducts reordering based on a timer. As a result, reordering requires waiting for an excessively long period of time for the missing packets.

SUMMARY OF THE INVENTION

Accordingly, the present invention has been made to solve the above-mentioned problems occurring in the prior art, and it is an aspect of the present invention to provide a method and an apparatus for reordering received packets by using a timer adapted to measure a variable length of time.

It is another aspect of the present invention to provide a method and an apparatus for reordering received packets based on a consideration of the HARQ processing time of respective missing packets.

In order to accomplish these aspects of the present invention, there is provided a method for reordering received packets in a mobile telecommunication system supporting HARQ, the method includes receiving from a receiving-side HARQ entity an input of a packet and processing time spent by the packet going through an HARQ operation; determining if a gap corresponding to at least one missing packet among received packets is detected based on the input packet belonging to the received packets and, when the gap is detected, waiting for a period of time obtained by subtracting the processing time from a predetermined maximum waiting value for the missing packet belonging to the gap to be received; and outputting the received packets to an upper layer in an order, except for the missing packet, when the missing packet belonging to the gap fails to be received before the period of time expires.

In accordance with another aspect of the present invention, there is provided an apparatus for reordering received packets in a mobile telecommunication system supporting HARQ, the apparatus includes a receiving-side HARQ entity for receiving a packet through an HARQ operation and outputting the packet when the packet has been successfully received without an error; a reordering buffer for buffering the packet output by the receiving-side HARQ entity; and a reordering controller for determining if a gap is detected based on the packet output by the receiving-side HARQ entity, the gap corresponding to at least one missing packet among packets buffered in the reordering buffer, the reordering controller waiting for the missing packet belonging to the gap to be received for a period of time when the gap is detected, the period of time being obtained by subtracting processing time spent by the packet output by the receiving-side HARQ entity to go through the HARQ operation from a predetermined maximum waiting value, the reordering controller outputting the received packets from the reordering buffer to an upper layer in an order, except for the missing packet, when the missing packet belonging to the gap fails to be received before the period of time expires.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described in detail with reference to the accompanying drawings. In the following description of the present invention, a detailed description of known functions and configurations incorporated herein is omitted to avoid making the subject matter of the present invention unclear. The terminology used herein should be defined based on the overall context of the description, not based on varying intentions or practices of users or operators. Although the present invention will be described with reference to an LTE system, the present invention is applicable to any type of HARQ-based telecommunication system without significant modification.

The present invention does not apply the same waiting time with regard to at least one missing packet belonging to a gap, when packets received as a result of an HARQ operation are to be reordered. Instead, the condition of a packet currently processed by an HARQ processor is considered for the application of the waiting time.

More particularly, when an HARQ processor has successfully received a packet through initial transmission and when another HARQ process has successfully received a packet after retransmission is conducted as many times as the maximum transmission limit, the order of the packets is changed. Based on the resulting time difference, the present invention determines the maximum waiting value, and subtracts the period of time for which the packet that has caused the change of order has been processed by the HARQ processor from the maximum waiting value to obtain waiting time. As such, the present invention proposes a reordering method based on a variable waiting time regarding missing packets.

It is considered that a gap has occurred when a packet having an SN greater than n is received before a packet having an SN of n (packet n) is received. As used herein, the gap may include not only packet n, but also following packets. For convenience of description, when a reordering unit receives a packet and recognizes that a gap has occurred, the packet which has caused the recognition that at least one packet is missing will now be referred to as a gap detecting packet.

The fact that packet n is missing means that a packet having an SN greater than n has been successfully received prior to packet n. The packet n is stored in an HARQ processor so that it is soft-combined with packets of the same data to be retransmitted later. If receipt fails until the maximum retransmission limit is reached, the packet n is flushed from the HARQ processor.

A reordering timer is used to wait for missing packets belonging to a gap to be received. If the missing packets are successfully received before the reordering timer stops, reordering is completed. If the missing packets fail to be received before the reordering timer stops, it is considered that reordering is completed, because there is no method for restoring the missing packets at the HARQ level. A subsequent operation is then conducted. For example, a request for retransmission at the ARQ level is transmitted. Alternatively, successfully received packets are transmitted to the upper layer.

When the reordering timer is started by the occurrence of a gap, the present invention considers the period of time for which the packet that has caused the detection of occurrence of the gap (i.e. gap detecting packet) has stayed in the HARQ processor.

The overall operation according to an exemplary embodiment of the present invention will now be described. In the following description, packets that are reordered refer to HARQ packets or upper layer packets contained in HARQ packets.

During call setup, the reordering unit is notified of the maximum value regarding the reordering timer for the corresponding reordering flow. The maximum value refers to the maximum waiting time determined based on a consideration of the worst change of order that may occur in the HARQ process. For example, when $(n+1)^{th}$ packet belonging to the reordering flow is successfully received through initial transmission and when $n^{th}$ packet is successfully received after retransmission is conducted as many times as the maximum retransmission limit, the difference in time between receipt of the $n^{th}$ and $(n+1)^{th}$ packets is the maximum value for the reordering timer. The maximum value and other setup values for the reordering timer can be given in ms (millisecond) unit, for example.

The receiving-side HARQ entity remembers the initial time of the receipt of a packet. When the packet is successfully received through at least one time of transmission, the receiving-side HARQ entity transmits the packet to the reordering unit together with the initial time of receipt of the packet (i.e. the length of period for which the packet has been stored in the HARQ processor).

When the reordering unit receives the packet and recognizes that a gap has occurred, the reordering unit subtracts the length of the period for which the packet has been stored in the HARQ processor from the maximum value for the reordering timer. Based on the resulting value, the reordering timer is started. If the receiving-side HARQ entity has notified of the initial time of receipt of the packet, the reordering unit subtracts the initial time of receipt from the time at which the receiving-side HARQ entity has transmitted the packet to the reordering unit, in order to obtain the period of time for which the packet has been stored in the HARQ processor. The obtained value undergoes an operation with the maximum value, and the result of operation is used to start the timer. The reordering unit then waits for missing packets belonging to the gap to be received while the reordering timer functions for the determined period of time.

If the missing packets fail to be received before the reordering timer stops, the reordering unit considers that the missing packets have failed to be received at the HARQ level, and conducts a necessary subsequent operation, for example requests ARQ retransmission.

Figure 4:
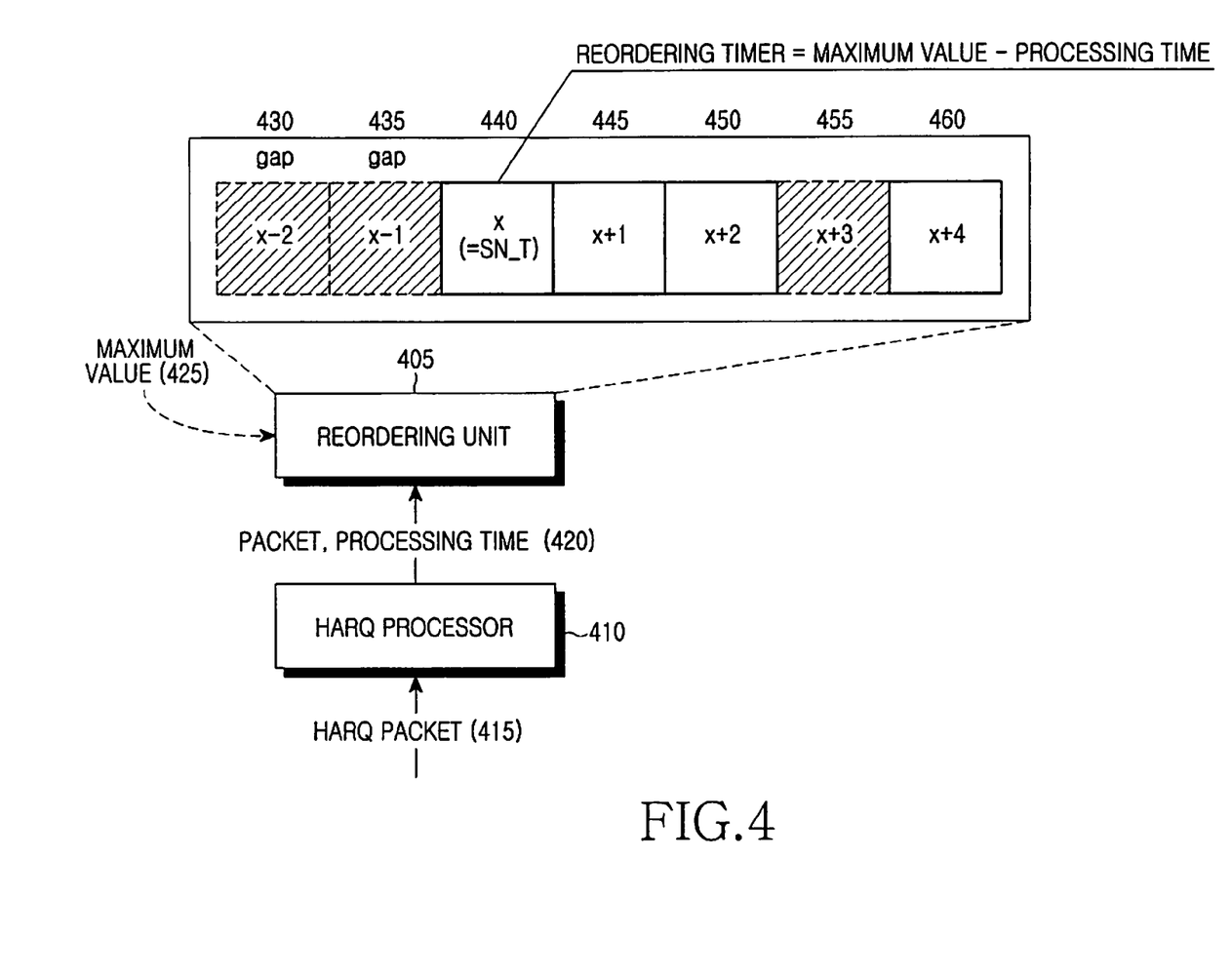
FIG. 4 illustrates a reordering scheme according to an exemplary embodiment of the present invention.

FIG. 4 shows a reordering scheme according to an exemplary embodiment of the present invention.

Referring to FIG. 4, an HARQ processor 410, which is a lower block in charge of an HARQ operation and a demultiplexing operation, properly processes a packet 415, which has been transmitted by the lower layer, based on the HARQ operation and transmits it to a reordering unit 405. The packet transmitted to the reordering unit 405 corresponds to data decoded with regard to the packet 415 or each upper layer packet contained in the data decoded with regard to the packet 415. The HARQ processor 410 transmits the successfully received packet together with the length of period 420 for which the packet has been stored in an HARQ buffer. For convenience of description, the length of a period for which a packet has been stored in an HARQ processor is referred to HARQ processing time of the packet. The HARQ processing time 420 of a packet corresponds to the difference in time between when the packet has initially been received and stored in the HARQ processor and when the HARQ packet is successfully received through an HARQ operation and output from the HARQ processor.

The reordering unit 405 is notified of the maximum value 425 regarding the activation of the reordering timer from the upper layer, e.g. a Radio Resource Control (RRC) layer. The maximum value 425 for the reordering timer is determined based on the worst change of order that may occur during the HARQ process. The maximum value 425 corresponds to the difference between the maximum and minimum periods of time for which a packet can stay in the HARQ processor 410. The maximum period of time for which a packet can stay in the HARQ processor 410 is related to the maximum retransmission limit determined by the required QoS of a reordering flow to which the packet belongs, etc.

When the HARQ processor 410 initially receives a packet 415, the HARQ processor 410 starts the timer from zero, and stops the timer when the packet 415 is successfully received through at least one HARQ transmission. The time at which the timer stops corresponds to the HARQ processing time 420 of the packet 415. The HARQ processor 410 outputs the successfully received packet and the HARQ processing time 420 of the packet measured by the timer.

When the HARQ processor 410 transmits packets, the reordering unit 405 buffers them in a reordering buffer (not shown) in the order of their SNs. The reordering unit 405 checks the SNs of the buffered packets and determines if a gap exists. If the SNs of the buffered packets do not follow the sequence, it is determined that a gap exists.

The reordering unit 405 remembers the highest SN among the SNs of packets reordered in the reordering buffer. For convenience of description, the highest SN added by one is referred to as a reordered_SN. If the SN of a packet transmitted by the HARQ processor 410 is not equal to the reordered_SN, the reordering unit 405 considers that packets having SNs ranging from the reordered_SN to an SN one less than the SN of the transmitted packet have failed to be received, i.e. they are missing packets.

For example, when the reordered_SN is x−2 and when packet x 440 is transmitted by the HARQ processor 410, packet x−2 and packet x−1 are detected as a gap.

The reordering unit 405 subtracts the HARQ processing time of the packet that has caused the detection of occurrence of the gap (i.e. gap detecting packet) from the maximum value 425 for the reordering timer. The resulting value is used to start the reordering timer. As such, the reordering timer is associated with the gap detecting packet, i.e. packet x 440. For convenience of description, the SN of the packet used to start the reordering timer is referred to as a timer SN (SN_T). Considering that the reordering timer is started with regard to the gap detecting packet, the SN_T is equal to the SN of the gap detecting packet.

If all missing packets having SNs less than the SN_T (in this example, SN_T is x, and missing packets are packet x−2 and packet x−1) are received before the reordering timer stops, the reordering unit 405 stops the reordering timer and conducts a subsequent operation with regard to the reordered packets, i.e. packet x−2, packet x−1, and packet x. In contrast, if not all missing packets having SNs less than the SN_T are received before the reordering timer stops, it is considered that the missing packets having SNs less than the SN_T have failed to be received at the HARQ level, and a subsequent operation is conducted.

For example, if a packet 435 having an SN of x−1 is not received until the reordering timer stops, it is considered that packet x−1 has failed to be received at the HARQ level, and a request for retransmission of the packet x−1 is made at the upper layer. In addition, it is considered that packets preceding the first missing packet having an SN greater than the SN_T have been reordered. In the case shown in FIG. 4, packet x+3 455 is the first missing packet having an SN greater than SN_T=x. Thus, packet x 440, packet x+1 445, and packet x+2 450 are considered to have been reordered, and are transmitted to the upper layer from the reordering unit 405.

As mentioned above, when a gap has occurred, the reordering timer is started with regard to the gap detecting packet according to the present invention. When the reordering timer stops, it is considered that packets having SNs less than that of the gap detecting packet are considered to have been reordered. This prevents persisting delay of reordering due to packets that have filed to be received at the HARQ level.

In addition, when the reordering time is started, the period of time for which the related gap detecting packet has been stored in the HARQ processor is subtracted from the maximum value 425 for the reordering timer. This facilitates the reordering process.

Figure 5:
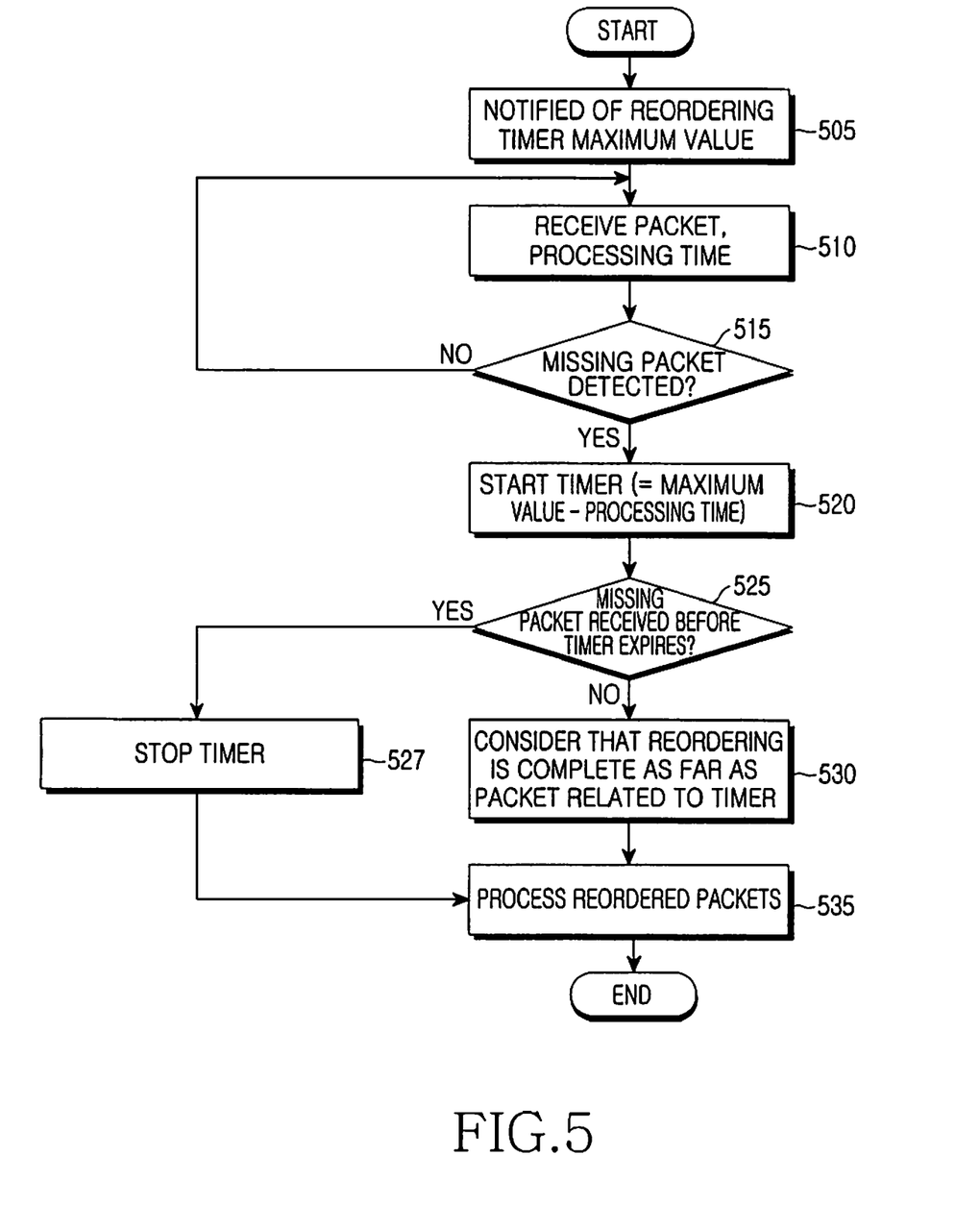
FIG. 5 is a flowchart showing a reordering operation according to an exemplary embodiment of the present invention.

FIG. 5 is a flowchart showing a reordering operation according to an exemplary embodiment of the present invention.

Referring to FIG. 5, the reordering unit is notified of the maximum value for the reordering timer from the upper layer in step 505.

Upon receiving a packet, the HARQ processor records the time of initial receipt of the packet. When the packet is completely received, the HARQ processor subtracts the time of initial receipt of the packet from the time at which receipt of the packet is successfully completed so as to obtain the HARQ processing time of the packet. The HARQ processor then transmits the successfully received packet and its HARQ processing time to the reordering unit. As such, the successfully received packet and its HARQ processing time are transmitted to the reordering unit from the HARQ processor in step 510.

After receiving the packet, the reordering unit determines if a gap is detected in step 515. If no gap is detected, the reordering unit returns to step 510 and waits for the next packet to be received from the HARQ processor. If a gap is detected, the reordering unit proceeds to step 520 and starts the reordering timer. The start of the reordering timer is associated with the packet that has caused detection of the gap (i.e. gap detecting packet). Particularly, the timer works for a period of time obtained by subtracting the HARQ processing time of the gap detecting packet from the maximum value given in step 505.

If all missing packets having SNs less than that of the gap detecting packet are received before the reordering timer stops in step 525, the reordering unit proceeds to step 527 and stops the reordering timer. The fact that the reordering unit has proceeded to step 527 means that no missing packet exists among packets having SNs less than that of the gap detecting packet associated with the reordering timer and, therefore, that all received packets have been reordered. Consequently, the reordering unit stops the reordering timer and proceeds to step 535.

In contrast, if at least one of the missing packets having SNs less than that of the gap detecting packet has failed to be received when the reordering timer has stopped, the reordering unit proceeds to step 530. The fact that the reordering unit has proceeded to step 530 means that, although at least one of the packets having SNs less than that of the gap detecting packet associated with the reordering timer is missing, the missing packet has already been removed from the HARQ buffer and cannot be received through the HARQ operation. Therefore, the reordering unit considers that reordering is complete at least as far as the gap detecting packet, and proceeds to step 535.

The reordering unit takes necessary measures with regard to reordered packets among buffered packets in step 535. For example, if there is a missing packet among reordered packets, the reordering unit requests retransmission of the missing packet at the RLC level. Alternatively, the reordering unit reconstructs the reordered packets into upper layer packets.

Figure 6:
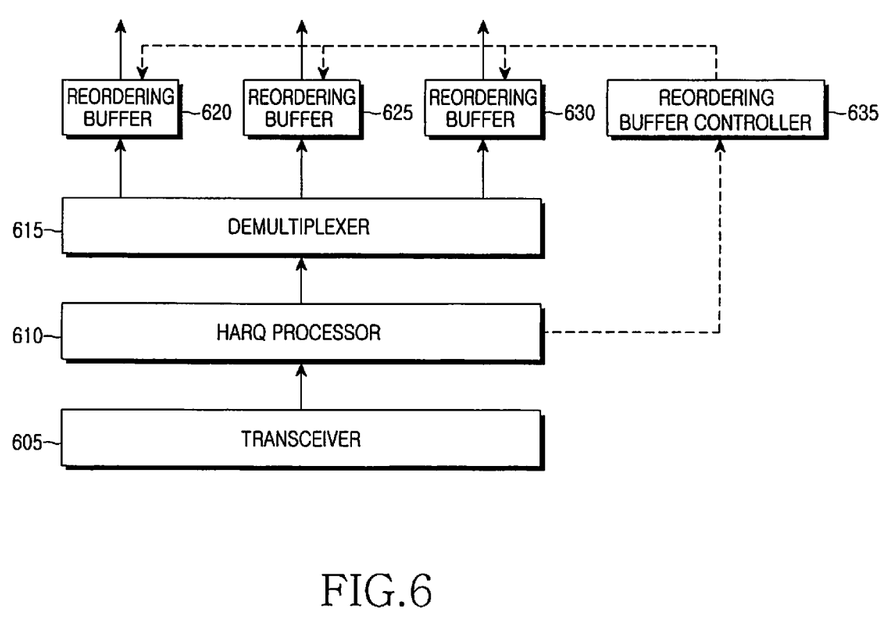
FIG. 6 is a block diagram showing the structure of a receiver according to an exemplary embodiment of the present invention.

FIG. 6 shows the structure of a receiver according to an exemplary embodiment of the present invention.

Referring to FIG. 6, the receiver includes a transceiver 605, an HARQ processor 610, a demultiplexer 615, a number of reordering buffers 620, 625, and 630, and a reordering buffer controller 635. The reordering buffers 620-630 and the reordering buffer controller 635 constitute a reordering unit. Although it will be assumed in the following description that upper layer packets are transmitted from the HARQ processor 610 via the demultiplexer 615 and are reordered, those skilled in the art can easily understand that the reordering operation according to the present invention is similarly applicable to HARQ packets which have not undergone demultiplexing. In other words, the reordering unit may come after the HARQ processor 610.

The transceiver 605 detects a packet by demodulating a radio signal received via a radio channel, for example, and transmits it to the HARQ processor 610.

The HARQ processor 610 channel-decodes an HARQ packet from the transceiver 605, soft-combines data stored in an HARQ buffer with the channel-decoded data, if necessary, and confirms if the HARQ packet has an error through a CRC operation. Depending on the result of confirmation, either ACK or NACK is sent to the transmitting side. In addition, the HARQ processor 610 records the time of initial receipt of the HARQ packet. When the HARQ packet is decoded without error, the HARQ processor 610 determines that the HARQ packet has been successfully received, and transmits the HARQ packet to the demultiplexer 615 together with its HARQ processing time, i.e. the period of time for which it has been stored in the HARQ processor 610, which is obtained by subtracting the time of initial receipt of the HARQ packet from the time of successful receipt of the HARQ packet. The unit of time may be the number of frames or sub-frames. More particularly, a frame/sub-frame is used as a unit of time for radio channels, and its number increases by one at every predetermined time, such as 0.5 msec or 10 msec.

The demultiplexer 615 interprets multiplexing information contained in the header of the HARQ packet transmitted by the HARQ processor 610, and sends upper layer packets, which are contained in the HARQ packet, to suitable reordering buffers 620-630 based on the multiplexing information. The length of period for which the HARQ packet has been stored in the HARQ processor 610 is sent to the reordering buffer controller 635.

Respective reordering buffers 620-630 store packets until they are reordered, and outputs reordered packets to the upper layer.

Upon detecting the occurrence of a gap in each reordering buffer, the reordering buffer controller 635 starts the reordering timer with regard to a packet that has caused the detection of the gap (i.e. gap detecting packet). The reordering buffer controller 635 controls the reordering buffers 620-630 so as to consider that the gap does not exist if the gap in each reordering buffer is not filled until the reordering timer stops. The reordering timer works for a period of time obtained by subtracting the length of time for which the gap detecting packet has been stored in the HARQ processor 610 (i.e. HARQ processing time of the gap detecting packet) from the maximum value given by the upper layer.

It has been assumed in the above description that the receiver has reordering buffers 620-630 following the HARQ scheme and that the reordering buffer controller 635 controls the reordering buffers 620-630 by using the reordering timer. However, the upper layer buffers and the reordering buffers may be the same devices. For example, a receiving buffer on the RLC layer adapted for ARQ (automatic retransmission request) may be implemented as the reordering buffer. The above description is similarly applied to such a case.

Some of the merits and effects of exemplary embodiments, as disclosed in the present invention, and as so configured to operate above, will be described as follows:

When packets, the order of which has changed, are to be reordered through an HARQ operation, the number of times of retransmission based on the HARQ operation is considered to variably determine the working time of a timer. This guarantees quick reordering, reduces the buffer capacity requirement on the HARQ processor, increases the packet processing rate, and improves the communication efficiency.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for reordering received packets in a mobile telecommunication system supporting HARQ, the method comprising the steps of:
    inputting from a receiving-side HARQ entity an input of a packet and processing time spent by the packet going through an HARQ operation;
    when a gap corresponding to at least one missing packet among received packets is detected based on the input packet belonging to the received packets, waiting for the missing packet belonging to the gap to be received for a period of time obtained by subtracting the processing time from a predetermined maximum waiting value;
    outputting the received packets to an upper layer in an order, if the period of time expires;
    starting a reordering timer based on a value obtained by subtracting the processing time from the maximum waiting value when the gap is detected based on the input packet; and
    stopping the reordering timer when all missing packets having sequence numbers less than a sequence number of the input packet are successfully received before the expiration of the reordering timer.

2. The method as claimed in claim 1, wherein the maximum waiting value corresponds to a difference in time between when a first packet is successfully received by the receiving-side HARQ entity through initial transmission and when a packet preceding the first packet is successfully received after retransmission is repeated as many times as a maximum retransmission limit.

3. The method as claimed in claim 2, wherein the maximum waiting value is given through the upper layer during call setup.

4. The method as claimed in claim 1, wherein the processing time of the packet corresponds to a difference between a time of an initial receipt of the packet and a time of a successful receipt of the packet through the HARQ operation.

5. The method as claimed in claim 1, further comprising outputting the received packets to the upper layer in an order when all missing packets belonging to the gap are successfully received before the expiration of the period of time, the missing packets belonging to the received packets, or when the missing packet belonging to the gap fails to be received until the period of time expires.

6. An apparatus for reordering received packets in a mobile telecommunication system supporting HARQ, the apparatus comprising:
    a receiving-side HARQ entity for receiving a packet through an HARQ operation and outputting the packet when the packet has been successfully received without an error;
    a reordering buffer for buffering the packet output by the receiving-side HARQ entity; and
    a reordering controller for waiting for the missing packet belonging to the gap to be received for a period of time when the gap corresponding to at least one missing packet among packets buffered in the reordering buffer is detected based on the packet output by the receiving-side HARQ entity, the period of time being obtained by subtracting a processing time spent by the packet output by the receiving-side HARQ entity to go through the HARQ operation from a predetermined maximum waiting value, the reordering controller outputting the received packets from the reordering buffer to an upper layer in an order if the period of time expires
    wherein the reordering controller is adapted to start a reordering timer based on a value obtained by subtracting the processing time from the maximum waiting value when the gap is detected based on the input packet and stop the reordering timer when all missing packets having sequence numbers less than a sequence number of the input packet are successfully received before the expiration of the reordering timer.

7. The apparatus as claimed in claim 6, wherein the maximum waiting value corresponds to a difference in time between when a first packet is successfully received by the receiving-side HARQ entity through initial transmission and when a packet preceding the first packet is successfully received after retransmission is repeated as many times as a maximum retransmission limit.

8. The apparatus as claimed in claim 6, wherein the maximum waiting value is given through the upper layer during call setup.

9. The apparatus as claimed in claim 6, wherein the processing time of the packet corresponds to a difference between time of an initial receipt of the packet and time of a successful receipt of the packet through the HARQ operation.

10. The apparatus as claimed in claim 6, wherein the reordering controller is adapted to output the received packets from the reordering buffer to the upper layer in an order when all missing packets belonging to the gap are successfully received before the expiration of the period of time, the missing packets belonging to the received packets or when the missing packet belonging to the gap fails to be received until the period of time expires.

* * * * *